(12) United States Patent
Huan et al.

(10) Patent No.: US 7,834,491 B2
(45) Date of Patent: Nov. 16, 2010

(54) ELECTRIC MOTOR

(75) Inventors: Wen Jun Huan, Shenzhen (CN); Jian Wen Zhang, Shenzhen (CN); Wai Shing Ip, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 52 days.

(21) Appl. No.: 12/247,725

(22) Filed: Oct. 8, 2008

(65) Prior Publication Data
US 2009/0091211 A1   Apr. 9, 2009

(30) Foreign Application Priority Data
Oct. 8, 2007    (CN) .................. 2007 1 0170199

(51) Int. Cl.
*H02K 5/00* (2006.01)
(52) U.S. Cl. .................. 310/40 MM; 310/233
(58) Field of Classification Search ........... 310/40 MM, 310/261.01, 233
See application file for complete search history.

(56) References Cited

U.S. PATENT DOCUMENTS

| | | | | |
|---|---|---|---|---|
| 4,822,958 A | * | 4/1989 | Van Laere | 200/1 V |
| 5,003,212 A | * | 3/1991 | Ibe et al. | 310/235 |
| 5,202,599 A | * | 4/1993 | Kao | 310/234 |
| 7,498,706 B2 | * | 3/2009 | Kuroda | 310/154.01 |
| 2003/0127941 A1 | * | 7/2003 | Otani et al. | 310/252 |
| 2004/0201300 A1 | * | 10/2004 | Honkura et al. | 310/156.43 |
| 2004/0261218 A1 | * | 12/2004 | Dilger et al. | 15/377 |
| 2007/0194642 A1 | * | 8/2007 | Yamaguchi et al. | 310/81 |

FOREIGN PATENT DOCUMENTS

JP    6022521    1/1994

* cited by examiner

*Primary Examiner*—Quyen Leung
*Assistant Examiner*—Leda Pham
(74) *Attorney, Agent, or Firm*—Muncy, Geissler, Olds & Lowe, PLLC

(57) ABSTRACT

A small size permanent magnet direct current motor has a housing accommodating a permanent magnet stator and a wound rotor. The rotor has a rotor core with a diameter of 23 mm±3 mm and 12 poles and a cylindrical commutator. The motor has an output power of more than 25 watts.

12 Claims, 3 Drawing Sheets

ELECTRIC MOTOR

CROSS-REFERENCE TO RELATED APPLICATIONS

This application is a non-provisional application claiming priority under 35 U.S.C. §119(a) from Patent Application No. 200710170199.2 filed in The People's Republic of China on 8 Oct. 2007.

FIELD OF THE INVENTION

This invention relates to electric motors and in particular to a high powered miniature PMDC motor.

BACKGROUND OF THE INVENTION

Many appliances and devices today use electric motors. Many of the devices want the electric motor to be smaller, lighter and more powerful. One such appliance is the brush roller motor for a vacuum cleaner.

This motor is in the floor cleaning attachment of the vacuum cleaner and thus should be as light as possible to reduce the weight of the attachment. Also, the smaller the motor, the smaller the attachment which means the smaller or tighter the area which can be accessed by the vacuum cleaner, especially useful for getting under low objects such as beds and sofas.

Accordingly, it is desirable to increase the power output of a miniature PMDC motor without increasing its size. Put another way, it is desired to decrease the size of a miniature PMDC motor without reducing its power.

Typically, the power brush roller motor has a size or foot print of about 70 mm×40 mm in a round cylindrical housing. Typically, the output of the motor is less than 20 watts. The output power is measured in watts using a standard motor testing assembly known as a Dynometer.

The improvements we have made to the motor design allow the motor to operate at least at 30 watts and optionally, at 35 watts output power, which is very much appreciated by the vacuum cleaner manufacturers and their customers.

SUMMARY OF THE INVENTION

Accordingly, in one aspect thereof, the present invention provides a miniature PMDC motor comprising: a housing; and a rotor, the rotor having a motor shaft, a rotor core fitted to the shaft, a commutator fitted to the shaft adjacent the rotor core, windings wound about the poles of the rotor core and terminated on segments of the commutator, wherein the rotor core has a diameter of 23 mm±3 mm and 12 poles and the commutator is a cylindrical commutator, and wherein the motor has an output power of more than 25 watts.

Preferably, the rated output power is 30 watts or more.

Preferably, the commutator has 24 segments.

Preferably, the commutator has a diameter of 20 mm or less, ideally about 14 mm.

Preferably, the rotor core has an axial length of 30 mm or less.

Preferably, the housing is cylindrical with two diagonally opposed flat sides joined by two arcuate sides, wherein arcuate permanent magnets are located on the inner surface of the arcuate sides. This gives the motor a lower height profile.

Preferably, an outer diameter of the housing measured across the arcuate sides is less than 40 mm.

Preferably, the length of the brushes is 12 mm±4 mm.

Preferably, the diameter of the motor measured across the flat surfaces of the housing and including a flux ring, if present, is 31 mm±3 mm.

According to a second aspect, the present invention also provides a vacuum cleaner power brush roller attachment incorporating a motor as defined above, for driving the brush roller.

BRIEF DESCRIPTION OF THE DRAWINGS

One preferred embodiment of the present invention will now be described, by way of example only, with reference to the accompanying drawings, in which.

DETAILED DESCRIPTION OF THE PREFERRED EMBODIMENTS

Figure 1:
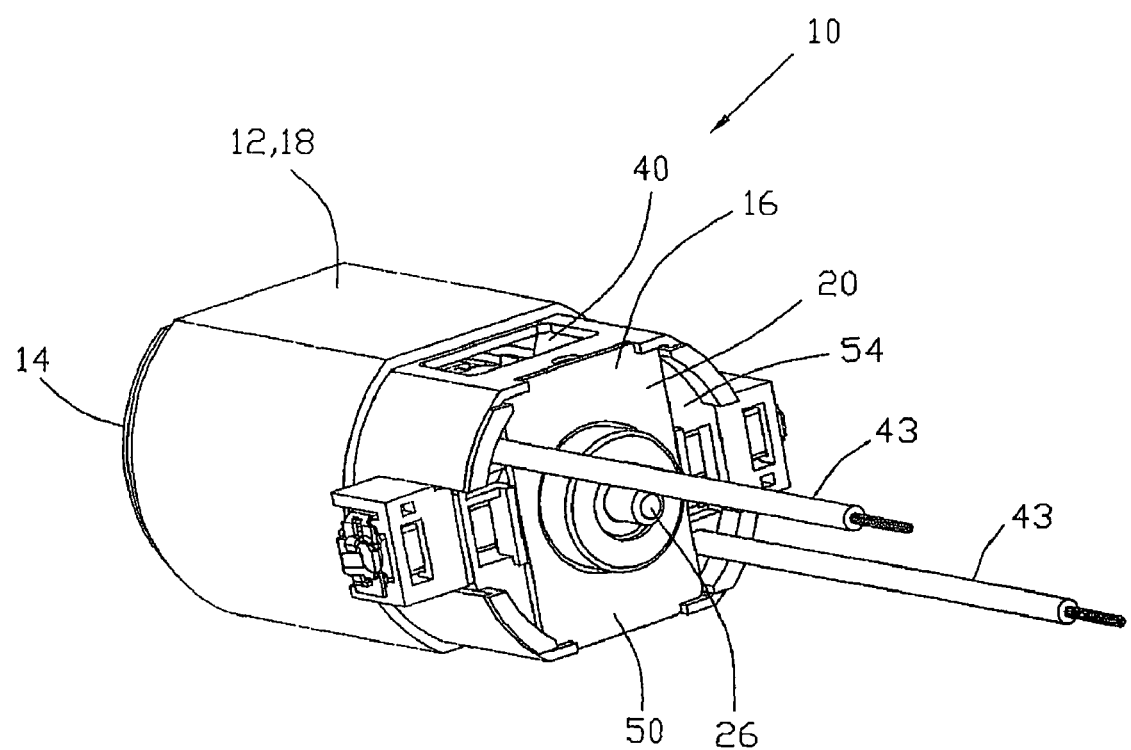
FIG. 1 is a perspective illustration of a motor according to a preferred embodiment of the present invention.

FIG. 1 illustrates a miniature PMDC motor 10 for use in the brush head of a vacuum cleaner for driving brush rollers. This type of device is commonly known as a power head and provides improved cleaning, especially for rugs and carpets. The size of the motor, particularly the diameter or radial height of the motor housing is a major factor in reducing the height of the power brush.

Figure 2:
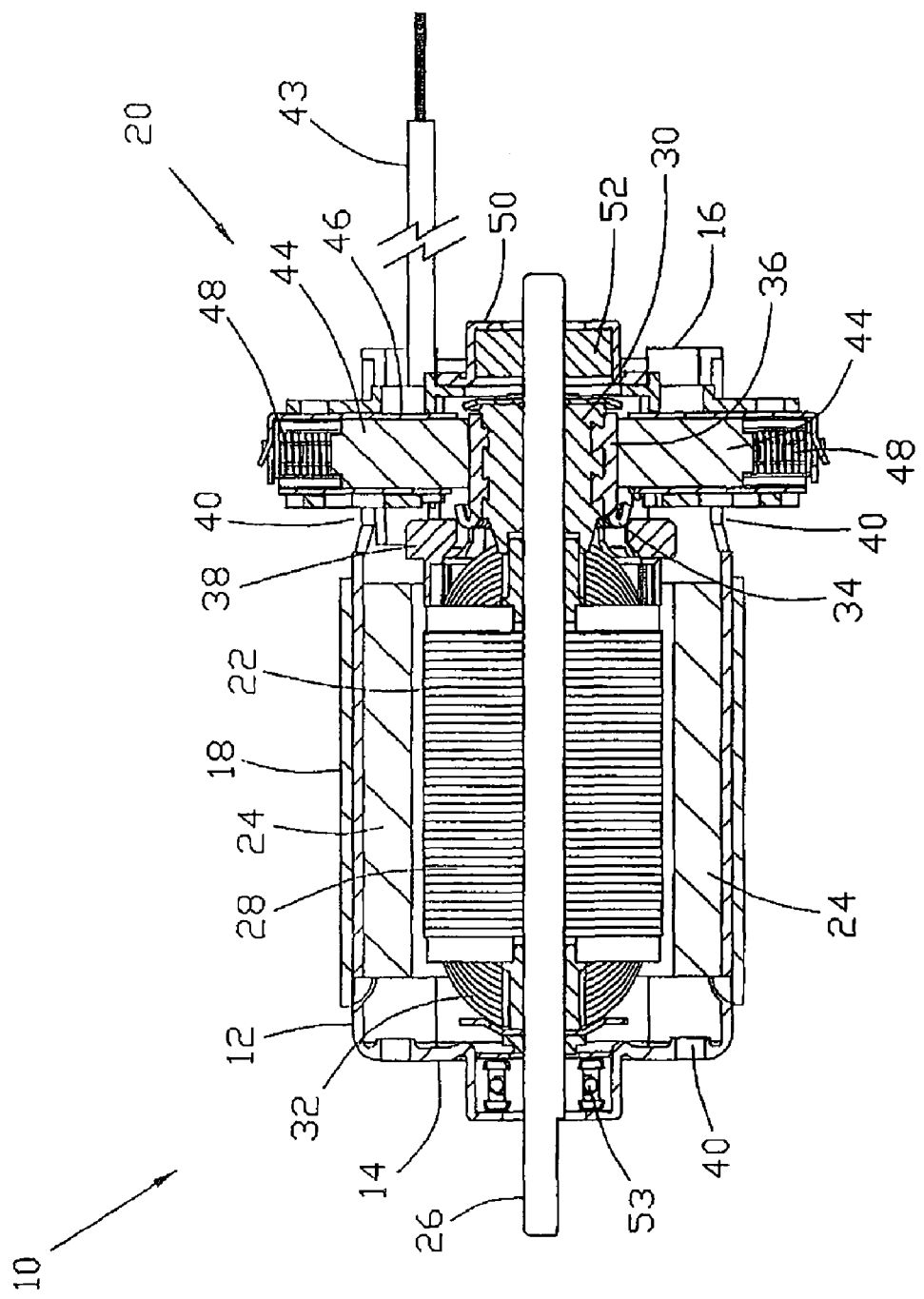
FIG. 2 is a section view of the motor of FIG. 1.

The motor, shown in sectional view in FIG. 2, has a housing 12 of the deep drawn metal can type having a closed end 14 and an open end 16 which is closed by an end cap 20. The housing is thus cylindrical with two flat sides joined by two arcuate sides and having one closed end. A flux ring 18 is fitted to an outer surface of the housing 12 and may be considered as a part of the housing. Flux rings are commonly used to reduce the magnetic resistance of the flux return path of a motor housing.

The housing 12 accommodates a rotor 22 and permanent magnets 24 forming the stator. The rotor 22 includes the shaft 26, on which is mounted a rotor core 28 and a commutator 30. Rotor windings 32 are wound about poles of the rotor core 28 and terminated on tangs 34 of segments 36 of the commutator 30. A fan 38 is fixed to the rotor core 28 and co-operates with openings 40 in the housing 12 to create air flow to cool the motor 10 when rotating.

The closed end 14 of the housing 12 has a boss accommodating a bearing 53 for rotatably supporting one end of the shaft 26 of the rotor 22.

The end cap 20 supports motor terminals 42 (which in this embodiment are connected to leads 43) and brush gear in the form of two cage brushes 44 which transfer power from the motor terminals to the windings, by making sliding electrical contact with the commutator 30.

Figure 3:
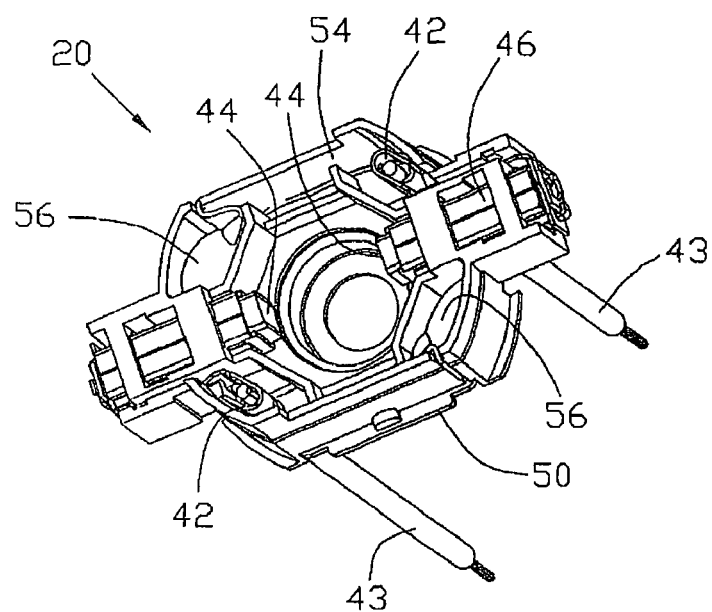
FIG. 3 is an inside view of an end cap being a part of the motor of FIG. 1.

The end cap 20, as shown in FIGS. 2 & 3, has a metal plate 50 which supports a bearing 52 for the shaft 26. The plate 50 is fitted to the open end 16 of the housing 12 and fixed in place by crimping the edge of the housing. Fixed on an inner surface of the plate 50 is a brush card 54, an electrically insulating support member of an engineering plastics material, which supports the motor terminals 42, the brushes 44, in this case by way of brass brush cages 46 in which the brushes slide, and any electrical components desired, such as noise suppression capacitors 56, diodes (not shown), etc. Brush springs 48 are located within the brush cages 46 for urging the brushes 44 into contact with the commutator segments 36.

The brush cages 46 may be fixed to the brush card as shown. Alternatively, the brush cages may be channels integrally formed as part of the brush card member, in which the brushes are slidably received. However, to increase the life of the motor, the length of the brushes 44 has been increased and to accommodate the longer brushes, the brush cages 46 and the brush card 54 have been extended so that the brush cages 46 extend radially beyond the radial dimension of the motor housing 12. As the brushes 44 are aligned or mounted on the horizontal plane, the vertical height of the motor is not increased by the longer brushes 44. By vertical height, we mean the diameter of the motor measured across the flat sides as in use the motor would be mounted with the flat surfaces extending horizontally to achieve the low profile desired for a power brush roller motor.

For the motor of the preferred embodiment, the useful length of the brushes is 12 mm. It is envisaged that brushes in the range of 8 to 16 mm in length would produce a significant increase in motor life for a 40 mm or less diameter motor over the 6 mm long brushes previously used.

To achieve an output rating of greater than 25 watts in a 300 series motor, the permanent magnets are high energy rare earth sintered arcuate magnets. The motor is a high speed motor designed to operate at more than 10,000 rpm under no load. A 300 series motor is a motor having a housing with an outer diameter of about 30 mm. In the embodiment shown, the housing has an outer diameter of 29 mm (measured across the flat surfaces) plus a 1 mm thick flux ring 18 giving the total outer diameter of the housing as 31 mm. So allowing a 10% variation in dimensions we say that the motor housing has an outer diameter of 31 mm±3 mm. It is also preferred that the motor housing has an outer diameter measured across the accurate sides of less than 40 mm. Thus the motor housing is considered as a 31×42 mm cylindrical housing when fitted with a 1 mm thick flux ring.

The motor is designed to operate at AC line voltage which has been full wave rectified. Thus, it is operating as a high voltage DC motor (HVDC).

There is also a requirement for long life. To operate any motor at a higher output power, one can simply increase the supply voltage or decrease the winding resistance. This will increase the motor current and thus the power of the motor but rapidly decrease the useful life of the motor.

In this embodiment, the motor is designed to run on 110 V AC full wave rectified to 110 V DC and to operate at a rated power output of 30 watts or more for at least 600 hours on average.

Figure 4:
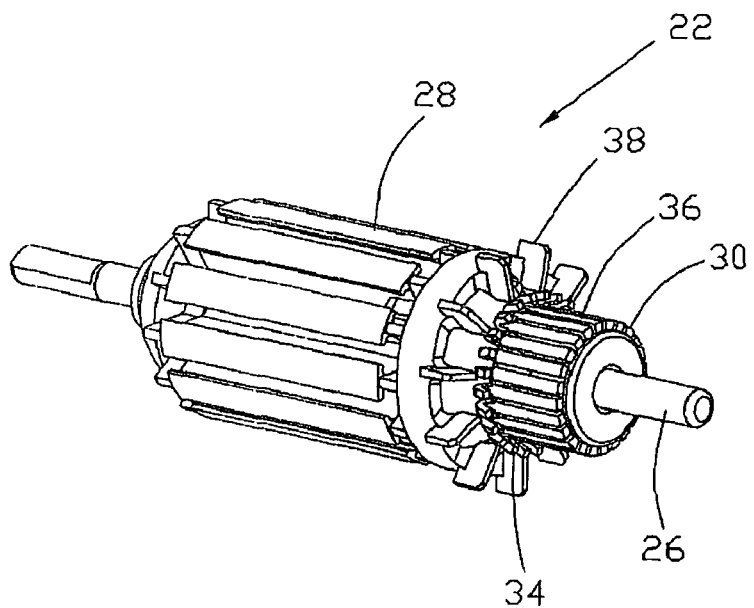
FIG. 4 is a view of a rotor being a part of the motor of FIG. 1.

The rotor 22, as shown in FIG. 4, has a rotor core 28 with 12 poles about which the rotor windings 32 (not shown in FIG. 4) are wound. It is preferred that the rotor core has a diameter of 23 mm±3 mm. The rotor windings are connected to tangs 34 of the commutator 30 which makes sliding contact with the brushes for transferring power from the power supply to the rotor windings. The commutator 30 has 24 commutator segments 36 and is known as a 24 bar commutator.

Figure 5:
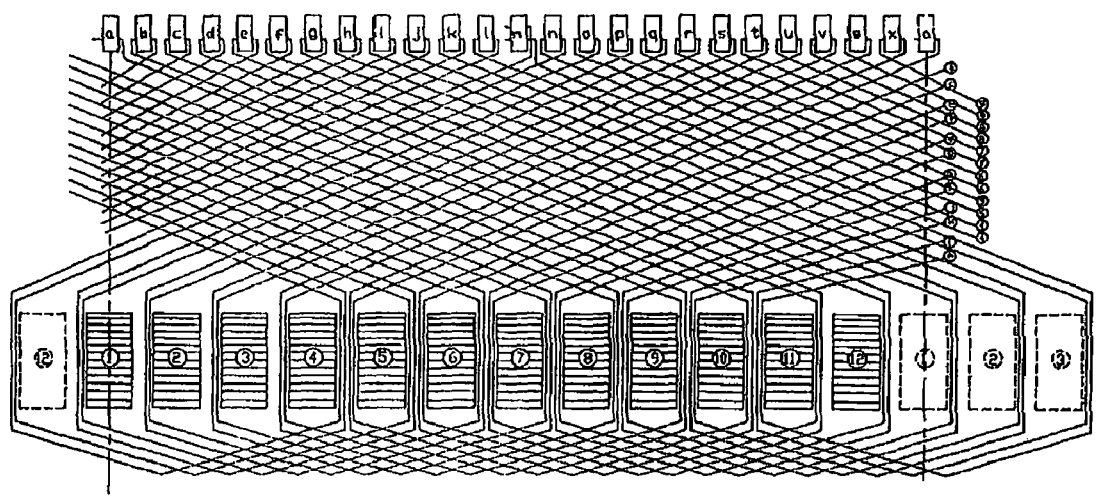
FIG. 5 is a winding diagram for the rotor of FIG. 4.

The actual arrangement of the rotor windings is shown in FIG. 5, in which the rotor windings are laid out. As can be seen, the rotor windings have 24 coils with each coil connected at each end to adjacent commutator segments. Each coil is wound about five poles of the rotor core and each group of five poles has or supports 2 coils. In this way, two coils wound about the same group of poles are connected to adjacent commutator segments with one commutator segment being connected to both coils. In this manner, the loading on the individual commutator segments is reduced allowing the motor to maintain a high loading without premature excessive wear.

The rotor winding arrangement of FIG. 5 is wound using a double fly winding machine. Hence it can be seen that tang a and tang m have two wires connected thereto. These are the start and finish lead wires of the winding process.

There is also an issue of reducing the physical wear on the brushes and this is achieved by maintaining the physical size of the commutator as radially small as possible. In the preferred embodiment, we have a 24 bar cylindrical commutator having a diameter of 14 mm. We believe that any 24 bar commutator having a diameter of 20 mm or less but preferably 16 mm or less would have an important role in reducing the physical wear on the brushes by reducing the surface speed of the commutator contact surface with respect to the brushes over the commonly available 24 bar commutator. The diameter of the commutator is measured across the round cylindrical surface formed by the commutator segments and forming the brush contact surface.

In keeping with the desire to maintain the motor small, we believe that the rotor core should also be limited in length. As such, it is preferred that the axial length of the rotor is 30 mm or less.

Although the invention has been described with reference to a preferred embodiment, it should be appreciated by those in the art that various modifications are possible within the scope of the invention. Therefore, the scope of the invention is to be determined by reference to the claims that follow.

The invention claimed is:

1. A high voltage miniature PMDC motor comprising:
   a housing; and
   a rotor, the rotor having a shaft, a rotor core fitted to the shaft, a commutator fitted to the shaft adjacent the rotor core, rotor windings wound about poles of the rotor core and terminated on segments of the commutator,
   wherein the rotor core has a diameter of 23 mm±3 mm and 12 poles and the commutator is a cylindrical commutator with a diameter of 20 mm or less and 24 segments, and the motor has an output power of more than 25 watts.

2. The motor of claim 1, wherein the rated output power is 30 watts or more.

3. The motor of claim 1, wherein the commutator has a diameter of 14 mm.

4. The motor of claim 1, wherein the rotor core has an axial length of 30 mm or less.

5. The motor of claim 1, wherein the housing is cylindrical with two diagonally opposed flat sides joined by two arcuate sides, wherein arcuate permanent magnets are located on an inner surface of the arcuate sides.

6. The motor of claim 5, wherein an outer diameter of the housing measured across the arcuate sides is less than 40 mm.

7. The motor of claim 6, wherein the length of the brushes is 12 mm±4 mm.

8. The motor of claim 6, wherein the diameter of the motor housing, measured across the flat surfaces of the housing, is 31 mm±3 mm.

9. The motor of claim 6, wherein the diameter of the motor housing, measured across the flat surfaces of the housing and including a flux ring, is 31 mm ±3 mm.

10. A vacuum cleaner power brush roller attachment having a brush roller and incorporating the motor of claim 1, for driving the brush roller.

11. The motor of claim 5, wherein the permanent magnets are high energy rare earth sintered arcuate magnets.

12. The motor of claim 1, wherein the motor operates at 10,000 rpm under no load.

* * * * *